(12) United States Patent
Hirano et al.

(10) Patent No.: US 7,916,702 B2
(45) Date of Patent: Mar. 29, 2011

(54) DYNAMIC NETWORK MANAGEMENT APPARATUS AND DYNAMIC NETWORK MANAGEMENT METHOD

(75) Inventors: Jun Hirano, Kanagawa (JP); Chan Wah Ng, Singapore (SG); Pek Yew Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 942 days.

(21) Appl. No.: 10/585,943

(22) PCT Filed: Jan. 14, 2005

(86) PCT No.: PCT/JP2005/000414
§ 371 (c)(1), (2), (4) Date: May 30, 2007

(87) PCT Pub. No.: WO2005/069559
PCT Pub. Date: Jul. 28, 2005

(65) Prior Publication Data
US 2008/0019330 A1    Jan. 24, 2008

(30) Foreign Application Priority Data
Jan. 15, 2004   (JP) ................................. 2004-008538

(51) Int. Cl.
*H04W 4/00* (2009.01)
(52) U.S. Cl. ........................................ 370/338; 455/433
(58) Field of Classification Search .................... 370/338
See application file for complete search history.

(56) References Cited

U.S. PATENT DOCUMENTS

| 6,571,289 | B1 | 5/2003 | Montenegro |
| 6,636,498 | B1 | 10/2003 | Leung |
| 2002/0147820 | A1* | 10/2002 | Yokote .......................... 709/229 |
| 2003/0104807 | A1* | 6/2003 | Momona ....................... 455/422 |
| 2006/0009213 | A1* | 1/2006 | Sturniolo et al. .......... 455/426.1 |
| 2008/0089257 | A1* | 4/2008 | Markki et al. ................ 370/310 |

FOREIGN PATENT DOCUMENTS

| JP | 2002522964 | 7/2002 |
| JP | 2003051818 | 2/2003 |

OTHER PUBLICATIONS

PCT International Search Report dated Apr. 19, 2005.
C. Perkins, et al.: "IP Mobility Support for IPv4," IETF RCF 3344, Aug. 2002, pp. 1-99.
DARPA "Internet Protocol," IETF RFC 791, Sep. 1981, pp. i-iii and 1-45.

(Continued)

*Primary Examiner* — Michael T Thier
(74) *Attorney, Agent, or Firm* — Dickinson Wright PLLC

(57) ABSTRACT

A technology is disclosed for certainly performing dynamic routing and error checking processes in the mobile network. According to this technology, the home agent sets up a Binding Acknowledgement message with a smaller Lifetime value when receiving a Binding Update message from a mobile router. During this smaller Lifetime, the mobile router can send a Routing Update message to the home agent. Thus, the home agent, for example, can check consistency of prefix information specified in the Biding Update with route installed by the Routing Update message. The present invention can be applied to both two distinct modes (explicit mode and implicit mode) that prefix information is specified in the Binding Update or not.

12 Claims, 8 Drawing Sheets

OTHER PUBLICATIONS

D. Johnson, et al.: "Mobility Support in IPv6," IETF Internet Draft, draft-ietf-mobileip-ipv6-24.txt, Work in Progress, Jun. 2003, pp. 1-172.

S. Deering, et al.: "Internet Protocol, Version 6 (IPv6) Specification," IETF RFC 2460, Dec. 1998, pp. 1-39.

W. Simpson: "IP in IP Tunneling," IETF RFC 1853, Oct. 1995, pp. 1-8.

A. Conta, et al.: "Generic Packet Tunneling in IPv6 Specification," IETF RFC 2473, Dec. 1998, pp. 1-36.

V. Devarapalli, et al.: "Nemo Basic Support Protocol," IETF Internet Draft, draft-ietf-nemo-basic-support-01.txt, Sep. 2003, pp. 1-33.

* cited by examiner

DYNAMIC NETWORK MANAGEMENT APPARATUS AND DYNAMIC NETWORK MANAGEMENT METHOD

TECHNICAL FIELD

The present invention relates to an apparatus and method for error checking in dynamic routing of a mobile network. Specifically, the present invention relates to an apparatus and method for error checking in dynamic routing over a bi-directional tunnel between a mobile router and a home agent in a mobile network using mobile IP.

BACKGROUND ART

With the emergence and proliferation of wireless technology, the Internet today has evolved to a stage where numerous data communication end-points are made up of mobile terminals, each roaming through different domains and attaching itself to different points of attachment to the packet-switched data communication network (such as, the Internet) at different points in time.

Such roaming provisioning is fairly matured in a circuit-switched communication network, such as the phone system. In a packet-switched communication network, however, supporting such roaming capabilities is difficult. This is because terminals in a packet-switched communication network are reached using unique addresses, and such addresses usually contain portions (usually the prefix) that must be valid in a spatial topology.

In addition, it is desirable for mobile terminals to continue be reached at the same address after a plurality of change of point of attachment to the packet-switched data communication network. This allows seamless continuation of sessions (such as file transfer) across different points of attachment to the packet-switched data communication network.

To support such roaming capabilities, the industry has developed solutions for mobility support as addressed by Mobile IPv4 (the following Non-patent document 1) in Internet Protocol version 4 (IPv4) (the following Non-patent document 2) and Mobile IPv6 (the following Non-patent document 3) in Internet Protocol version 6 (IPv6) (the following Non-patent document 4). In Mobile IP, each data communication terminal (called a mobile node) has a permanent home domain. When the mobile node is attached to its home network, it is assigned a permanent global address known as a home address.

When the mobile node is away, i.e. attached to some other foreign networks, it is usually assigned a temporary global address known as a care-of address. Such a temporary address is usually assigned by the access router the mobile node is associated to, and is aggregated at the address topology of the access router s that the care-of address is topologically correct in the routing infrastructure of the global network.

The idea of mobility support is such that the mobile node can be reached at the home-address even when it is attached to other foreign networks, so that other nodes in the packet-switched data communication network need only identify the mobile node by the mobile node's home address.

This is done in the Non-patent documents 1 and 3 with an introduction of an entity at the home network known as a home agent. Mobile nodes register their care-of-addresses with the home agents using messages known as Binding Updates.

The home agent is responsible to intercept messages that are addressed to the mobile node's home-address, and forwards the packet to the mobile node's care-of-address using IP-in-IP Tunneling (the following Non-patent documents 5 and 6). IP-in-IP tunneling involves encapsulating an original IP packet in another IP packet. The original packet is sometimes referred to as the inner packet, and the new packet that encapsulates the inner packet is referred to as the outer packet. Such a binding between home-addresses and care-of-addresses, made known at the home agent of the mobile node, allows the mobile node to be reached no matter where the mobile node is.

It is possible to extend the concept of host mobility support as stipulated in the Non-patent documents 1 and 3 to network mobility support (NEMO) (the following patent document 1 and Non-patent document 7). This is the case where the mobile node is itself a mobile router, and a plurality of nodes move together with the mobile router, forming a mobile network. After the mobile router sends a Binding Update message to its home agent, packets sent to the mobile network are intercepted by the home agent and tunneled to the mobile router.

The mobile router then decapsulates the tunnel packet, and forwards the inner packet to the destination. Similarly, packet sent from a node in the mobile network is tunneled to the home agent by the mobile router to be forwarded to the correct destination. The mobile router itself may act as an access router, allowing other mobile node (mobile host or mobile router) to associate with the mobile router and gain access to the global communication network through it.

In the Non-patent document 7, Binding Update messages sent by the mobile Router can be constructed in two distinct modes: an implicit mode where no information of the mobile network prefix is specified and an explicit mode where the mobile router will place its mobile network prefix within the Binding Update message.

Implicit mode is used when prefix information is manually configured at the home agent, and the home agent can construct the routing table to forward packets sent to the mobile network without having the mobile router to explicitly state its mobile network prefix or prefixes.

Explicit mode allows the mobile router to explicitly state the mobile network prefix or prefixes it is managing. This frees the home agent from needing to know the prefix information in advance.

Home agents are required to send responses indicating the status of a Binding Update back to the mobile router in the form of a Binding Acknowledgement message. When the binding fails, different status values in Binding Acknowledgement will give an indication of the reason of failure. It can either be an error in setting up the forwarding mechanism, or that the mobile router is unauthorized to set up the binding for the specified prefix or prefixes.

When the home agent does not have prior knowledge of prefixes belonging to a mobile router, it can send back a negative acknowledgement to an implicit mode Binding Update with the reason of forwarding set-up failure. When an explicit mode Binding Update specifies a wrong or unauthorized prefix or prefixes, the home agent can send back a negative Binding Acknowledgement with the reason of unauthorized prefix.

[Non-patent document 1] Perkins, C. E. et. al., "IP Mobility Support", IETF RCF 3344, August 2002.

[Non-patent document 2] DARPA, "Internet Protocol", IETF RFC 791, September 1981.

[Non-patent document 3] Johnson, D. B., Perkins, C. E., and Arkko, J., "Mobility Support in IPv6", IETF Internet Draft: draft-ietf-mobileip-ipv6-24.txt, Work In Progress, June 2003.

[Non-patent document 4] Deering, S., and Hinden, R., "Internet Protocol Version 6 (IPv6) Specification", IETF RFC 2460, December 1998.

[Non-patent document 5] Simpson, W., "IP in IP Tunneling", IETF RFC 1853, October 1995.

[Non-patent document 6] Conta, A., and Deering, S., "Generic Packet Tunneling in IPv6", IETF RFC 2473, December 1998.

[Non-patent document 7] Devarapalli, V., et. al., "NEMO Basic Support Protocol", IETF Internet Draft: draft-ietf-nemo-basic-01.txt, September 2003.

[Patent document 1] Leung, K. K., "Mobile IP mobile router", U.S. Pat. No. 6,636,498, October 2003.

In both the Patent document 1 and Non-patent document 7, the mobile router can optionally run a dynamic routing protocol (such as Inter Gateway Protocol:IGP, Realm Specific Internet Protocol:RIP, or Open Shortest Path First:OSPF) over the bi-directional tunnel it established with its home agent, just like when the mobile router is directly attached to its home agent. When the mobile router does so, routing information about the mobile network prefix or prefixes will be disseminated using the routing protocol. However, it was not specified which mode the mobile router should use when sending Binding Update, whether implicit or explicit mode.

Should the mobile router choose to use implicit mode, the response of the home agent is again unclear. Since a dynamic routing protocol is used after the bi-directional tunnel is established, the home agent cannot know the mobile network prefix at the time the implicit mode Binding Update is received. Obviously, the home agent cannot send a negative Binding Acknowledgement, contrary to what is specified in the Non-patent document 7, since it is expecting the prefixes information to come after the bi-directional tunnel is established.

In addition, it cannot know if the mobile router will indeed run a dynamic routing protocol if the home agent responds with a positive Binding Acknowledgement. If the mobile router is not running a dynamic routing protocol, then the home agent should revert back to the expected behavior of sending a negative Binding Acknowledgement with a reason of forwarding set-up failure. But, it has already sent a positive Binding Acknowledgement when in anticipation of a dynamic routing protocol to be run.

On the other hand, if the mobile router chooses to use explicit mode, it is unclear how the home agent should respond if the prefix information conveyed in the Binding Update is not reflected in the dynamic routing message later sent by the mobile router, or even when they are inconsistent.

Thus, the error checking and graceful fail-over mechanism at home agents for running dynamic routing protocol over the bi-directional tunnel are almost non-existent in either mode.

DISCLOSURE OF THE INVENTION

In addition, in certain deployment, the mobile router may be delegated prefix by the home agent using a dynamic routing protocol or otherwise. In this case, the mobile router is now waiting for the home agent to send prefix information. It is also unclear how the mobile router should behave when the home agent fails to send prefix delegation information to the mobile router. Since the mobile router needs to advertise the prefix to its ingress network for nodes to auto-configure their addresses, it is important for the mobile router to have a procedure whereby it can test for prefix delegation, and smoothly fall back to using some default prefix within a known period of time.

The first embodiment of the current invention seeks to address the problem faced by the home agent by providing an error-checking and fail-over mechanism installed at the home agents. This involves the deployment of a technique called Temporary Acceptance Technique whereby a home agent grants the mobile router a small time period when it first receives a binding update message from the mobile router by using a smaller Lifetime value in binding acknowledgment. This allows the mobile router some time to send routing update messages over the now-established bi-directional tunnel. By using a smaller Lifetime value, the mobile router is forced to renew the binding very shortly, so that the home agent can perform error notifications when the mobile router next send a binding update if there is an error.

Note that because the Lifetime field is also stored in the binding cache entry, even if the mobile router does not renew the binding with a new binding update message, the binding cache entry will also be automatically purged.

In addition, the current invention provides for a highly flexible set of configuration parameters to configure the response of the home agent. This allows administrator total flexibility when configuring the behavior of home agent in the event of a conflict between routes installed through the binding update mechanism and routes installed through the dynamic routing protocol over the bi-directional tunnel.

Furthermore, the second embodiment of this specification covers the case when a mobile router is waiting for prefix delegation from the home agent. The mobile router first sends implicit binding update messages with small Lifetime values to check if the home agent supports prefix delegation. After the Lifetime value expires for some specified number of times, the mobile router then defaults to sending explicit mode binding update messages using some default prefixes. Thus, the mobile router can have a graceful bi-directional tunnel establishment by first testing if the home agent has prefix to delegate, and fall back to using a default set of prefix if the home agent does not delegate prefix.

An apparatus and method of the present invention have the advantage of certainly performing dynamic routing and error checking processes in the mobile network. Specifically, they have the advantage of certainly performing dynamic routing and error checking processes with the bi-directional tunnel between a mobile router and a home agent.

BEST MODE FOR CARRYING OUT THE INVENTION

Figure 1:
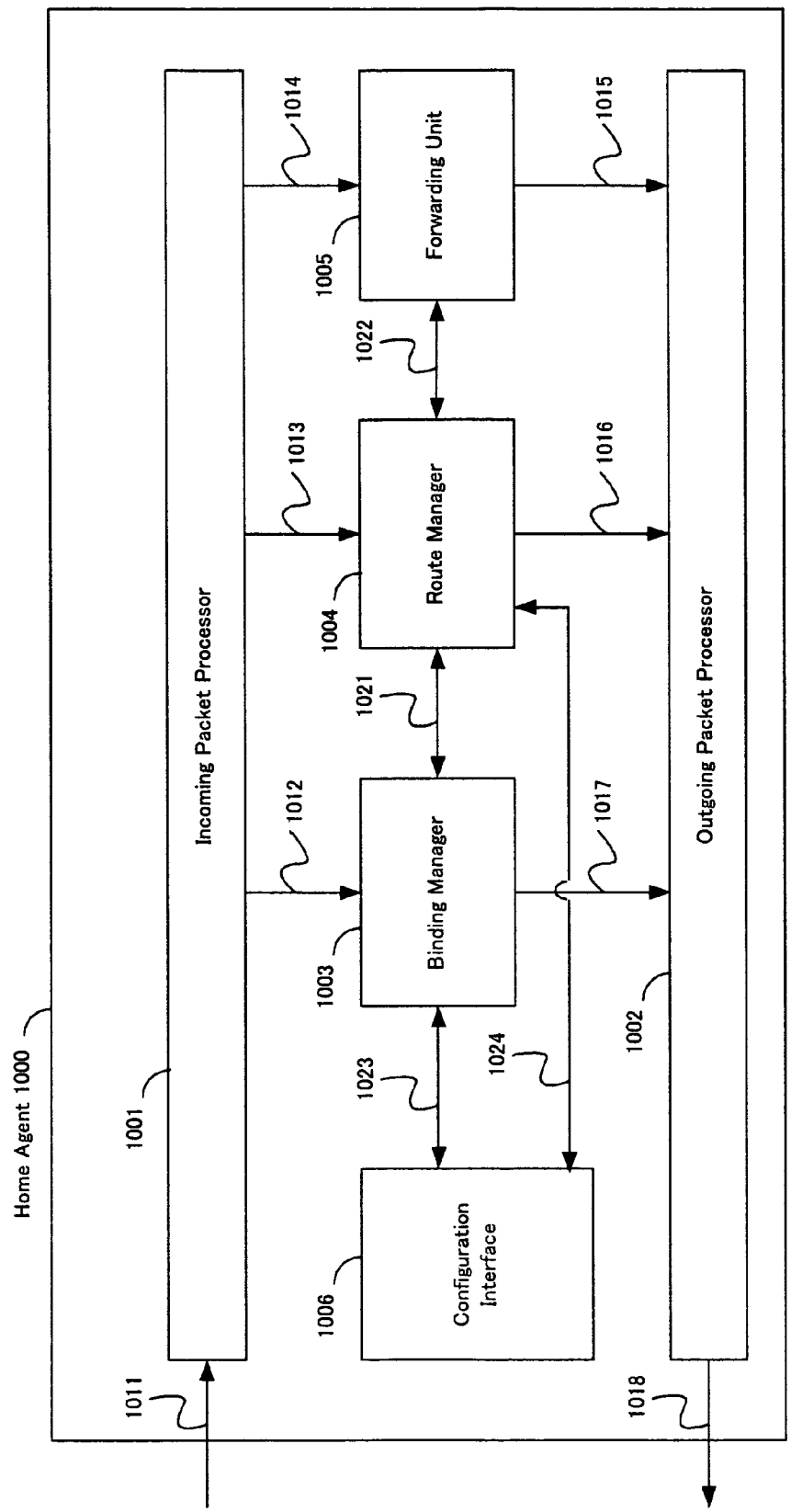
FIG. 1 is a diagram showing architecture of a home agent in the embodiments of the present invention.

An apparatus and method for error checking and fail-over mechanism to be deployed in home agents are disclosed in this description. To help understand the disclosed invention, the following definitions are used:

(i) A "packet" is a self-contained unit of data of any possible format that could be delivered on a data network. A "packet" normally consists of two portions: a "header" and a "payload" portion. The "payload" portion contains data that are to be delivered, and the "header" portion contains information to aid the delivery of the packet. A "header" must have a source address and a destination address to respectively identify the sender and recipient of the "packet".

(ii) A "packet tunneling" refers to a self-contained packet being encapsulated into another packet. The act of "packet tunneling" is also referred to as "encapsulation" of packets. The packet that is being encapsulated is referred to as the "tunneled packet" or "inner packet". The packet that encapsulates the "inner packet" is referred to as the "tunneling packet" or "outer packet". Here, the entire "inner packet" forms the payload portion of the "outer packet".

(iii) A "mobile node" is a network element that changes its point of attachment to the global data communication network. It may be used to refer to an end-user terminal, or an intermediate network element that serves as a gateway, a router, or an intelligent network hub that can change its point of attachment to the global data communication network. The "mobile node" that is an end-user terminal is more specifically referred to as a "mobile host"; whereas the "mobile node" that is an intermediate network element that serves as a gateway, a router, or an intelligent network hub is more specifically referred to as a "mobile router".

(iv) A "default router" of a network element refers to a router residing on the same link of the network element where all packets originated from the network element with a destination that the network element has no other known route to reach are forwarded to.

(v) An "access router" of a mobile node refers to a router which the mobile node associates with to attach to the data communication network. It is usually the default router of the mobile node. An access router of a mobile node may itself be mobile.

(vi) A "home-address" is a primary global address assigned to a mobile node that can be used to reach the mobile node regardless of where on the global data communication network the mobile node is currently attached to. In this description, the abbreviation "HoA" is used to abbreviate "home-address".

(vii) A mobile node that is attached to the global data communication network where its home-address is topologically compatible with the addresses used in the vicinity of the point of attachment is referred to as "at home". The vicinity of this point of attachment that is controlled by a single administrative authority is referred to as the "home domain" of the mobile node.

(viii) A mobile node that is attached to the global data communication network at a point where the home-address of this mobile node is topologically incompatible with the addresses used in the vicinity of that point of attachment is referred to as "away", and the vicinity of this point of attachment is referred to as the "foreign domain".

(ix) A "care-of-address" is a temporary global address assigned to a mobile node that is away such that the assigned "care-of-address" is topologically compatible with the addresses used in the vicinity of the mobile node's point of attachment to the global data communication network. In this description, the abbreviation "CoA" is used to abbreviate "care-of-address".

(x) A "home agent" is a network entity that resides at the home domain of a mobile node that performs registration services of care-of-addresses of the mobile node when it is away, and to forward packets addressed to the home-address of the mobile node to the care-of-address of the mobile node. Note that a home agent is also a router.

(xi) A "Binding Update" is a message sent from a mobile node to its home agent that informs the recipient the current care-of-address of the sender. This forms a "binding" between the care-of-address and the home-address of the mobile node at the recipient. The message also contains a Lifetime field to indicate the validity period of such a binding. In this description, the abbreviation "BU" is used to abbreviate "Binding Update".

(xii) A "Binding Acknowledgement" is a message sent from a home agent to a mobile node in response to a Binding Update to indicate the status of the said Binding Update (e.g. whether it is successful or otherwise). The message also contains a Lifetime field to indicate the validity of the binding, which may override the Lifetime specified in the corresponding Binding Update message. In this description, the abbreviation "BA" is used to abbreviate "Binding Acknowledgment", the abbreviation "BA-OK" is used to abbreviate a "Binding Acknowledgement with success indication", and the abbreviation "BA-NEG" is used to abbreviate a "Binding Acknowledgement with unsuccessful indication".

(xiii) A "Routing Update" is a message sent between routers to inform the routes available from the sending router. This represents all messages exchanged between routers when running a dynamic routing protocol with the intent of disseminating route information. In this description, the abbreviation "RU" is used to abbreviate "Routing Update".

In the following description, for purpose of explanation, specific numbers, times, structures, and other parameters are set forth in order to provide a thorough understanding of the present invention. However, it will be apparent to anyone skilled in the art that the present invention may be practiced without these specific details.

First Embodiment

The first embodiment of the present invention discloses a mechanism for a home agent to check for and react to error conditions which arise from a registered mobile router running dynamic routing protocol over a bi-directional tunnel that is established between the mobile router and the home agent. To this end, an apparatus as depicted in FIG. 1 is employed in home agents.

FIG. 1 shows the architecture of a home agent 1000 employing the current invention, consisting of an Incoming Packet Processor block 1001, an Outgoing Packet Processor block 1002, a Binding Manager 1003, a Route Manager 1004, a Forwarding Unit 1005 and a Configuration Interface 1006. Packet flow paths 1011 through 1018 indicate the possible flow paths of a data packet, and signal paths 1021 through 1024 indicate the communication channel between functional blocks. Note that these paths are symbolic and may or may not be actual wires in implementation. In practice, most of the functional blocks are implemented in software, and thus likewise these paths are just possible programming interfaces for different software modules to communicate with one another.

Packets received by the home agent 1000 are passed to Incoming Packet Processor 1001 via the packet flow path 1011 for all standard networking protocol processing (such as Internet Protocol processing). When packets are identified to be mobility related (such as a BU message), the Incoming Packet Processor 1001 will pass such packets to the Binding Manager 1003 via the packet flow path 1012. When packets are identified to be routing related (such as a RU message), the Incoming Packet Processor 1001 will pass such packets to the Route Manager 1004 via the packet flow path 1013. Packets that need to be forwarded to other nodes (note that a home agent is normally also a router) are passed to the Forwarding Unit 1005 via the packet flow path 1014. Note that the Incoming Packet Processor 1001 is also responsible for decapsulating packets received from an established bi-directional tunnel.

The Outgoing Packet Processor 1002 handles the processing of packets necessary before sending packets out to the physical network wires. The processing involved may include selecting a default route if no route is indicated by the sending module and filling in empty fields with default values in the mandatory protocol headers of the outgoing packets. After processing, packets are sent out to the physical medium via the packet flow path 1018.

The Binding Manager 1003 is responsible for the management of bindings of addresses of mobile nodes. Binding information is usually managed in the form of binding cache, where each cache entry specifies the binding of home-address to a care-of-address of a mobile node. In the case where the mobile node is a mobile router, other information such as the mode of the BU (implicit or explicit) and mobile network prefixes included in the BU are also stored in the binding cache. The Binding Manager 1003 is also responsible for the setting up and tearing down of forwarding mechanism (such as forwarding packets sent to a mobile network prefix to the mobile router by tunneling the packets to the mobile router's care-of-address) in the Route Manager 1004. For this purpose, the signal path 1021 is shown connecting the Binding Manager 1003 to the Route Manager 1004. In addition, the Binding Manager 1003 must process mobility related packets such as BU messages. This allows it to update the binding cache, and send back BA messages. These BA messages are passed to the Outgoing Packet Processor 1002 for actual transmission.

The Route Manager 1004 is responsible for the management of routes. Routes are usually managed in the form of a routing table, where each row shows the routing information to a specific network prefix. It is also responsible for handling the RU messages received from other routers, and sending of its own routing messages to other nodes. When sending RU messages, the message is passed to the Outgoing Packet Processor 1002 for actual transmission via the packet flow path 1016.

When the Route Manager 1004 receives RU messages from a mobile router via a bi-directional tunnel, it must maintain a list of routes that are injected by the mobile router. This will facilitate the Binding Manager 1003 to request that the Route Manager 1004 to remove all routes injected by the mobile router when the bi-directional tunnel between the home agent 1000 and the said mobile router is tore down.

The Forwarding Unit 1005 is responsible for the routing of packets to other nodes (including sending packets through a bi-directional tunnel). It obtains information on how to route a given packet from the Route Manager 1004. For this purpose, a signal path 1022 is shown to connect the Forwarding Unit 1005 and the Route Manager 1004. The Forwarding Unit 1005 can then pass the data packet to the Outgoing Packet Processor 1002 via the packet flow path 1015, with possible attached indications on where to forward the packet.

The Configuration Interface 1006 is the module that provides configuration information to the Binding Manager 1003 and Route Manager 1004. Such configuration information may be loaded by the Configuration Interface 1006 from a secondary storage during system boot-up. When the Configuration Interface 1006 loads information this way, it has to frequently monitor that such information has not been modified after system boot-up, and reload the information if the information is modified. Alternatively, the Configuration Interface 1006 may be an active process that allows a human administrator to key in configuration parameters in real time, either with the administrator sitting in-front of the terminal, or the administrator may remotely logged into the configuration process from another location.

It is also possible for the Configuration Interface 1006 to load the configuration information from a remote central database. In fact, the Configuration Interface 1006 may be implemented as a database client agent, where each configuration query is relayed by the Configuration Interface 1006 to a remote central database. In addition, other more autonomous techniques may also be employed to load configuration information to the home agent 1000. This may involve the use of Simple Network Management Protocol (SNMP) where an external agent sends the home agent 1000 packets containing Management Information Base (MIB). These MIBs contain configuration information for the home agent 1000. Thus the Configuration Interface 1006 can be implemented as an SNMP Agent sending queries to a remote agent, and interprets the responses containing the MIBs, and constructs the configuration information.

The Configuration Interface 1006 provides two types of configuration information to other modules: system-wide configuration information and mobile router specific configuration information.

System-wide configuration information includes:

(i) gDynRtgEnabled: whether dynamic routing protocol is enabled for mobile routers that are away from home;

(ii) gMaxBULifetime: the maximum lifetime of binding cache entries;

(iii) gMaxRULifetime: the maximum lifetime of routing table entries;

(iv) gTempBULifetime: the lifetime of a binding cache entry to use when it is unclear whether a dynamic routing protocol will be run by an away mobile router; and (v) gMaxTempBU: the maximum number of Binding Update messages to accept while it is unclear whether a dynamic routing protocol will be run by an away mobile router.

Mobile router specific configuration information includes:

(i) mrSecAssoc: security associations of mobile router (such as pre-established security key associated to the mobile router);

(ii) mrDynRtgEnabled: whether the particular mobile router can run dynamic routing protocols;

(iii) mrDynRtgProtocol: if dynamic routing is enabled for the mobile router, this value indicate the type of dynamic routing protocol the mobile router can run;

(iv) mrDefaultPrefixList: any default network prefixes that are associated to the mobile router;

(v) mrValidPrefixList: the range of network prefixes that can be legally associated to the mobile router; and (vi) mrBURUErrAction: the default action to be taken when the prefix information contained in a BU message is in conflict or inconsistent with the routing information sent by the mobile router.

For mrBURUErrAction, the value can be any of the following:

(i) BURUErrTeardown: teardown the bi-directional tunnel when there is an error;

(ii) BURUErrIgnoreBU: silently ignore the prefix information given in the BU message and return a BA-OK message;

(iii) BURUErrWarnBU: ignore the prefix information given in the BU message, and send back a BA-OK that contains an extra option indicating that the prefix information is ignored;

(iv) BURUErrIgnoreRU: ignore the RU message by silently discarding it; or (v) BURUErrWarnRU: ignore the RU message and send back an error message using the dynamic routing protocol.

As mentioned earlier, the Binding Manager 1003 maintains the binding information in a binding cache. The current invention requires that each entry in the binding cache to contain at least the following information:

(i) bceHoA: home-address of the mobile router;

(ii) bceCoA: care-of-address of the mobile router;

(iii) bceMode: the mode (implicit or explicit) of the last successful BU message received;

(iv) bceExpiry: the time at which this entry will expire (and be deleted);

(v) bceprefix: prefix information contained in the last successful BU message received; and (vi) bceNumTempBU: the number of BU messages received while it is still unclear whether a dynamic routing protocol will be run by the mobile router.

Figure 2:
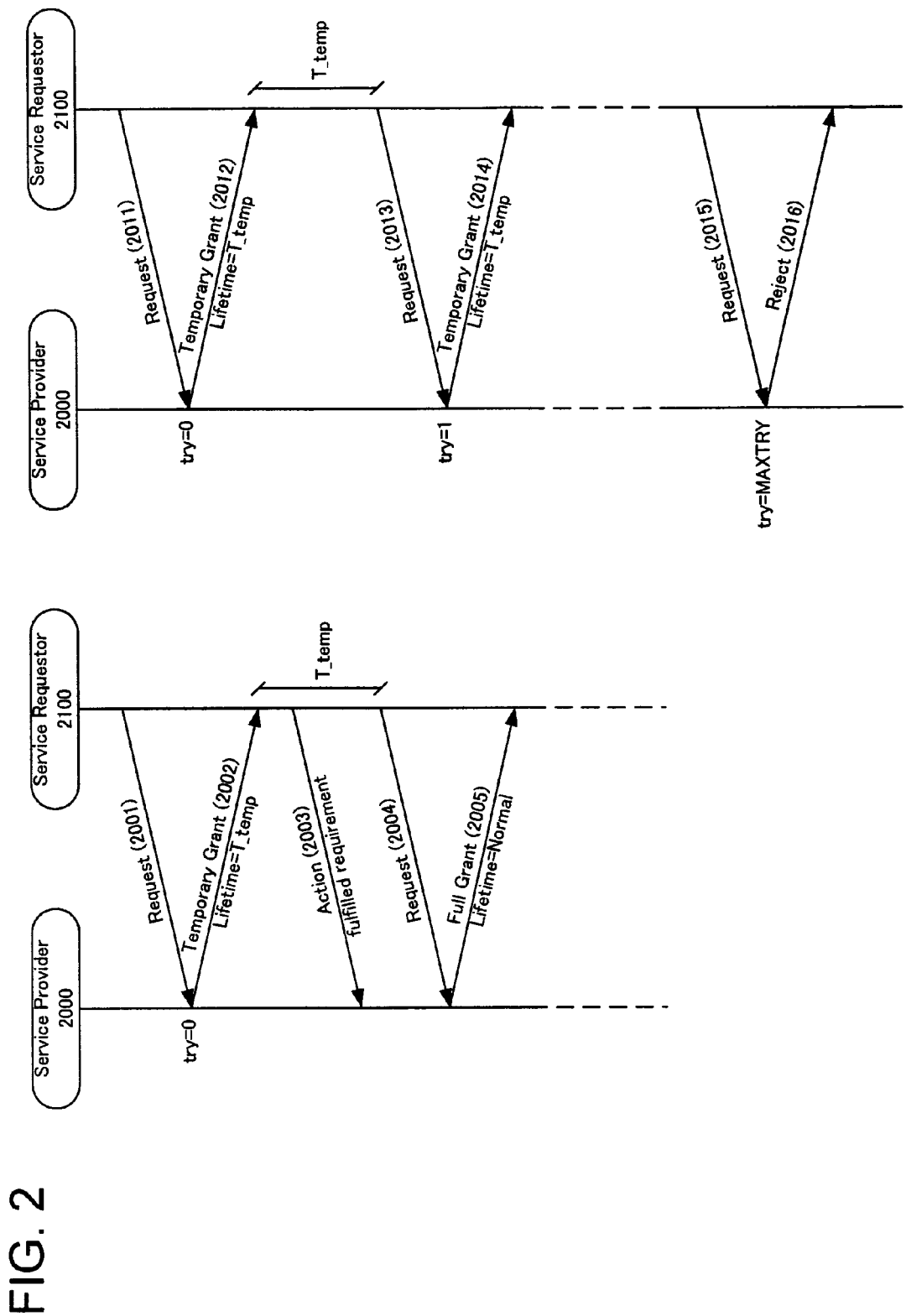
FIG. 2 is a diagram showing an example of a message exchange sequence to illustrate the principle of Temporary Acceptance Technique in the embodiments of the present invention.

The last information, bceNumTempBU, together with the global configuration information gTempBULifetime and gMaxTempBU allow the Binding Manager 1003 to implement a technique called Temporary Acceptance Technique. The Temporary Acceptance Technique, as illustrated in FIG. 2, is used in a situation where a service provider 2000 is providing a service to a single or plurality of service requester 2100 such that the said service requires the service requester 2100 to fulfill a certain requirement. However, fulfillment of such requirement cannot be known or carried out until the service is granted.

The basic idea behind the Temporary Acceptance Technique is for the service provider 2000 to grant acceptance to a request subjected to a validity period T_temp that is much shorter than is normal, thus forcing the service requester 2100 to renew its request after this short validity period. This gives the service requester 2100 some limited time to fulfill some specific requirement (for example, action 2003 as shown in the FIG. 2). When this requirement is fulfilled, the next time the service requester 2100 renew its request (request 2004 in FIG. 2), the service provider 2000 can then grant it a normal access (full grant 2005 in FIG. 2).

However, the service requester 2100 may not perform the action that will fulfill the specific requirement. In this case, the service provider 2000 may choose to allow the service requester 2100 some number of tries, say MAXTRY. Should the service requester 2100 failed to fulfill the specific requirement after the maximum number of requests, the service provider 2000 can then reject the request. This is shown in FIG. 2 where after the requests 2011 and 2013, the service requester 2100 has yet to fulfill some requirement. Thus at the MAXTRY-th request 2015, the service provider 2000 send a reject 2016.

This Temporary Acceptance Technique can thus be used to limit the wait of a required event (i.e. action 2003) before accepting a request in full to a known period of time, given by MAXTRY multiplied by T_temp. This effectively allows the service provider 2000 to delay a decision on whether or not to grant the request based on whether or not a requirement is fulfilled within this delay.

Applied in the context of the current invention, home agent 1000 (the service provider 2000) can grant the mobile router (the service requester 2100) a small time period when it first receives a BU message from the mobile router by using a smaller Lifetime value in BA-OK message. This smaller Lifetime value is gTempBULifetime. This allows the mobile router some time to send RU messages (the required action) over the now-established bi-directional tunnel. The configuration parameter gMAXTempBU is the maximum number of BU messages the home agent is willing to accept before a RU message is received. The binding cache entry value bceNumTempBU is used to keep track of the number of BU messages received before a RU message, so that home agent 1000 can reject the BU message once bceNumTempBU hit a value equal to gMaxTempBU. Note that because the Lifetime field is also stored in the binding cache entry, even if the mobile router does not renew the binding with a new BU message after gTempBULifeTime, the binding cache entry will be automatically purged.

Figure 3:
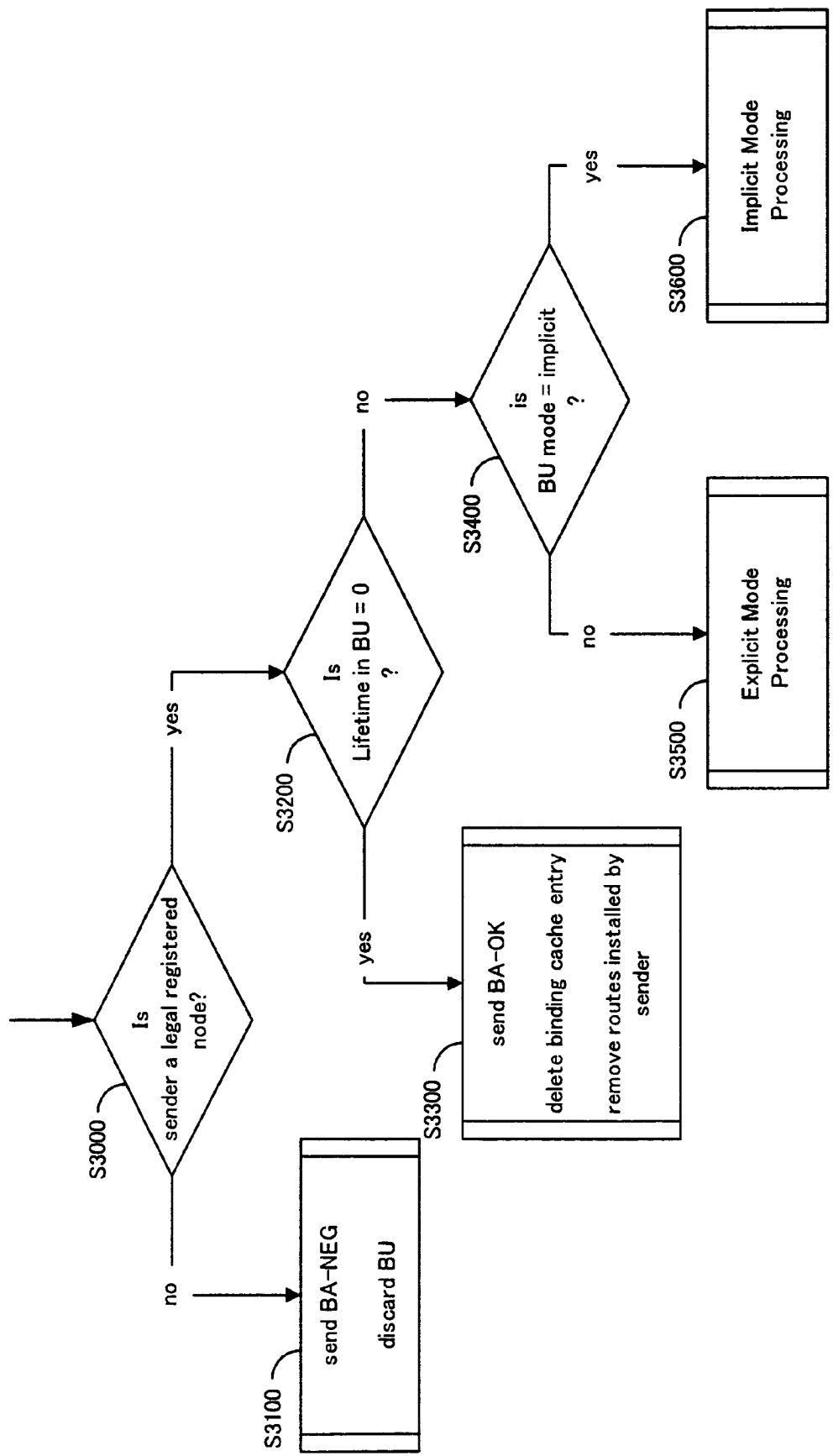
FIG. 3 is a diagram showing a general algorithm used by the home agent when processing a newly received binding update message from a mobile router in the embodiments of the present invention.

Using this technique, the Binding Manager 1003 can follow the method stipulated in this description when handling BU messages received from mobile routers. FIG. 3 shows the general processing when a BU message is passed to the Binding Manager 1003. In step S3000, the Binding Manager 1003 first checks if the sender of this BU message is an authorized mobile router (a legal registered node) to use the services provided by home agent 1000 (step S3000: Is sender a legal registered node?). This can be done by querying the Configuration Interface 1006 to retrieve the set of mobile router information given the home address of the mobile router. If the mobile router is authorized, the Configuration Interface 1006 will respond with the set of configuration information. Else the query will most likely fail with a reason akin to "No configuration found" or "Mobile Router is not a valid entry".

Figure 4:
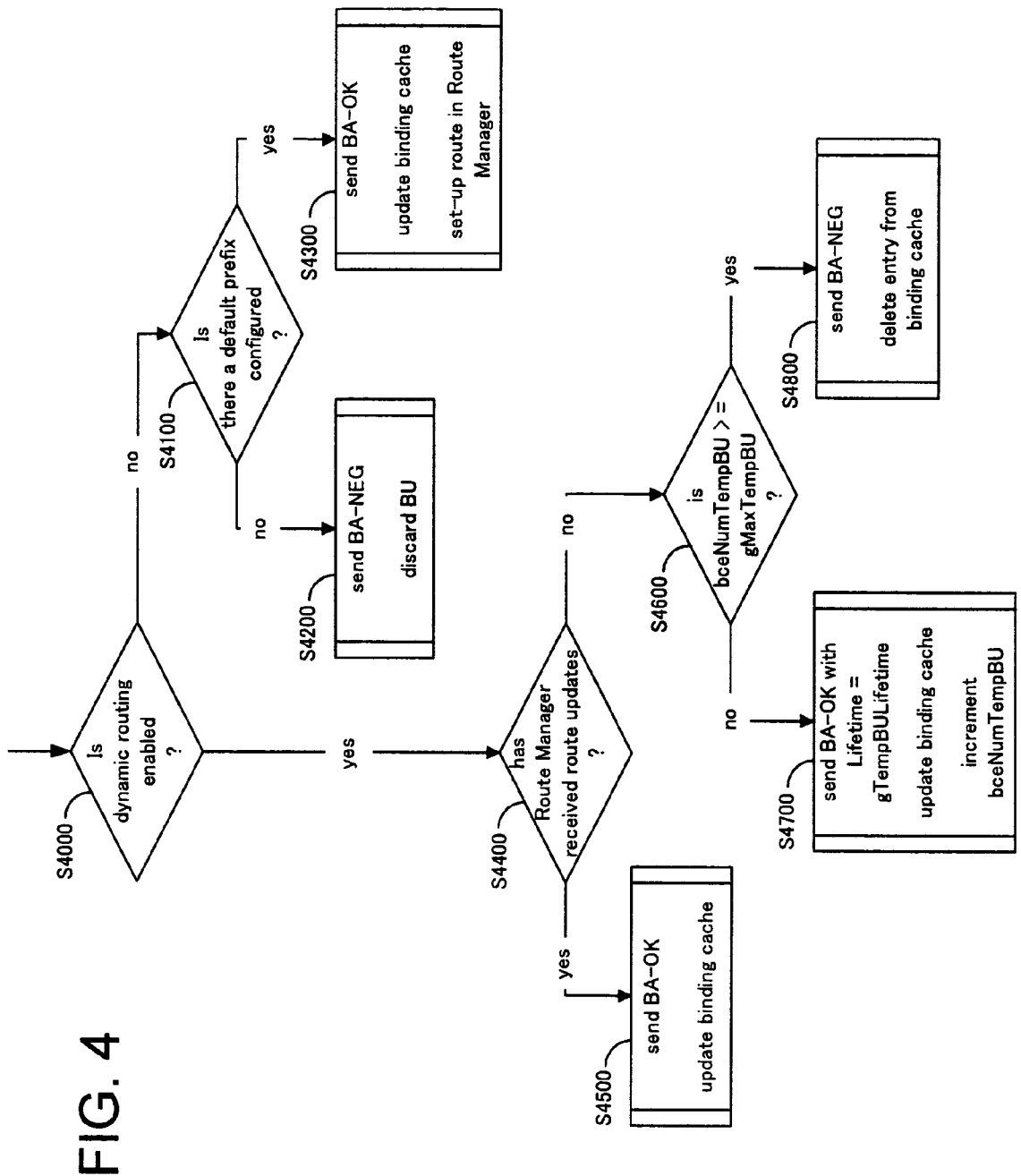
FIG. 4 is a diagram showing an algorithm used by the home agent when processing a newly received binding update message from a mobile router in the embodiments of the present invention.

If the sender (i.e. mobile router) is not authorized, the home agent replies with a BA-NEG message, and discard the BU message, as shown in step S3100 (step S3100: send BA-NEG, discard BU). If the sender is a legal registered mobile router, the Lifetime field of the BU message is then checked to see if it is zero, as shown in step S3200 (step S3200: Is Lifetime in BU=0?). If the Lifetime field is zero, this means the mobile router is deregistering the bindings. Thus in step S3300, the binding cache entry for the mobile router is deleted, all routes installed by the mobile routers are removed from the Route Manager 1004, and a BA-OK message is send to the mobile router indicating a successful deregistration (step S3300: send BA-OK, delete binding cache entry, remove routes installed by sender). For a non-zero Lifetime field, processing will depend on the mode of the BU message (step S3400: is BU mode=implicit?). If it is an implicit mode BU, the Implicit Mode Processing as shown in FIG. 4 will be used (step S3600: Implicit Mode Processing). If it is an explicit mode BU, the Explicit Mode Processing shown in FIG. 5 will be used (step S3500: Explicit Mode Processing).

In Implicit Mode Processing as shown in FIG. 4, the first step S4000 is to check if dynamic routing is enabled for this mobile router (step S4000: Is dynamic routing enabled?). The Binding Manager 1003 can do so by checking the mrDynRtgEnabled configuration parameter. If it is not enabled, the branch to step S4100 will be taken, where the Binding Manager 1003 checked if there is a default prefix configured for the mobile router (step S4100: Is there a default prefix configured?). This can be done by checking the mrDefaultPrefixList configuration parameter. If there is no default prefix, then the home agent 1000 cannot set up a forwarding mechanism in the Route Manager 1004. Thus in step S4200, a BA-NEG message is returned, and the BU message is discarded (step S4200: send BA-NEG, discard BU). On the other hand, if there is a default prefix configured for the mobile router, the Binding Manager 1003 then proceeds to step S4300, where it returns a BA-OK message, updates the binding cache entry, and sets-up the forwarding mechanism for the default prefix in the Route Manager 1004 (step S4300: send BA-OK, update binding cache, set-up route in Route Manager).

The step S4400 will be taken if dynamic routing is enabled for the mobile router. Here, the Binding Manager 1003 will consult the Route Manager 1004 to see if the mobile router has already sent RU messages to home agent 1000 (step S4400: has Route Manager received route updates?). If so, there is no problem in using implicit mode BU message. Thus in step S4500, a BA-OK message is returned, and the binding cache entry is updated (step S4500: send BA-OK, update binding cache). However, should there be no RU messages received (yet), the Binding Manager 1003 will use the Temporary Acceptance Technique described previously. In step S4600, the counter bceNumTempBU is checked if it is greater than or equal to the global configuration parameter gMaxTempBU (step S4600: is bceNumTempBU>= gMaxTempBU?). If it is, the grace period for mobile router to send RU messages has expired, and home agent 1000 will send a BA-NEG and delete the binding cache entry for the mobile router, as shown in step S4800 (step S4800: send BA-NEG, delete entry from binding cache). If bceNumTempBU is less than gMaxTempBU, the mobile router still has some time left to send RU messages. Thus in step S4700, home agent 1000 will send a BA-OK with the Lifetime field changed to gTempBULifetime. The binding cache entry is also updated, with the counter bceNumTempBU incremented (step S4700: send BA-OK with Lifetime=gTempBULifetime, update binding cache, increment bceNumTempBU).

Figure 5:
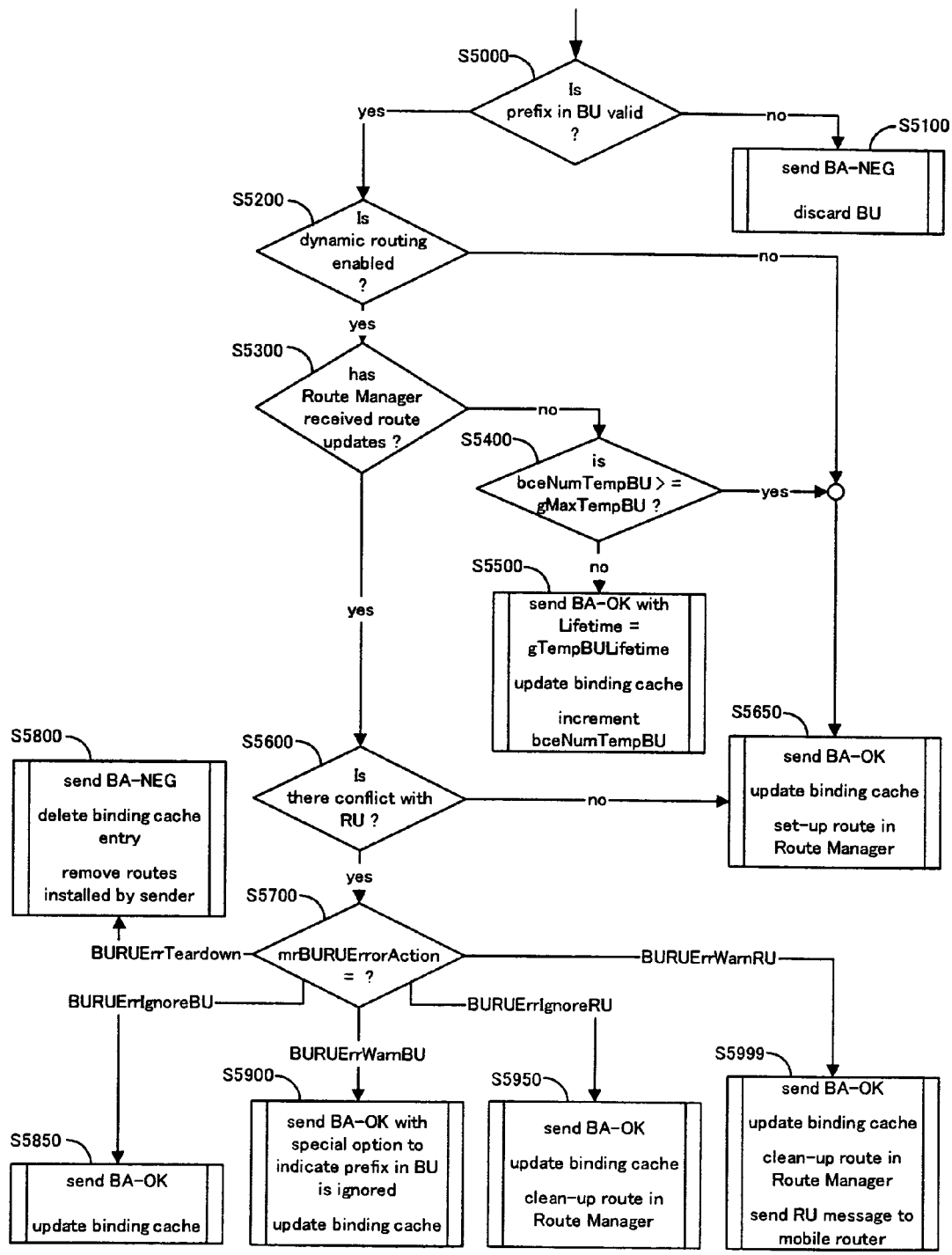
FIG. 5 is a diagram showing an algorithm used by the home agent when processing a newly received binding update message from a mobile router in the embodiments of the present invention.

FIG. 5 shows the processing for an explicit mode BU. In explicit mode BU, the mobile router inserts prefix information in the BU message. So the first step S5000 is to check if the prefix specified in the BU message is valid (step S5000: Is prefix in BU valid?). Validity can be checked by querying the configuration parameter mrValidPrefixList for the mobile router from the Configuration interface 1006. If it is not valid, a BA-NEG is sent and the BU message is discarded, as shown in step S5100 (step S5100: send BA-NEG, discard BU). If the prefix is valid, then in step S5200, the Binding Manager 1003 checks if dynamic routing is enabled for the mobile router (step S5200: Is dynamic routing enabled?). This can be done by checking the mrDynRtgEnabled configuration parameter. If dynamic routing is not enabled, step S5650 will be taken, where a BA-OK message will be sent, in addition to updating the binding cache entry and setting up the forwarding mechanism for the prefix in the Route Manager 1004 (step S5650: send BA-OK, update binding cache, set-up route in Route Manager).

On the other hand, if dynamic routing is enabled, in step S5300, Route Manager 1004 is checked if RU messages were received from the mobile router (step S5300: has Route Manager received route updates?). If not, then the Binding Manager 1003 will use the Temporary Acceptance Technique previously described. In step S5400, the counter bceNumTempBU is checked if it is greater than or equal to the global configuration parameter gMaxTempBU (step S5400: is bceNumTempBU>=gMaxTempBU?). If it is, the grace period for mobile router to send RU messages has expired, and it is assumed that the mobile router will not run the dynamic routing protocol. In this case, step S5650 is taken, where a BA-OK message will be sent, in addition to updating the binding cache entry and setting up the forwarding mechanism for the prefix in the Route Manager 1004. However, if bceNumTempBU is less than gMaxTempBU, the mobile router still has some time left to send RU messages. Thus in step S5500, home agent 1000 will send a BA-OK with the Lifetime field changed to gTempBULifetime. The binding cache entry is also updated, with the counter bceNumTempBU incremented (step S5500: send BA-OK with Lifetime=gTempBULifetime, update binding cache, increment bceNumTempBU).

In this case where RU messages have been received from the mobile router, the home agent 1000 has to check the consistency between the prefix or prefixes specified in the BU message and the routes that are installed through RU messages. Thus in step S5600, the Route Manager 1004 is consulted to see if there is any conflict between the prefix in BU message and those routes installed through RU messages (step S5600: Is there conflict with RU?). If there is no conflict, the step S5650 is taken, where a BA-OK message will be sent, in addition to updating the binding cache entry and setting up the forwarding mechanism for the prefix in the Route Manager 1004.

When there is a conflict between the prefix in the BU and the routes installed by dynamic routing protocol, the configuration parameter mrBURUErrAction is checked to get the appropriate action to be taken, as shown in step S5700 (step S5700: mrBURUErrorAction=?). If the action is to teardown the bi-directional tunnel (mrBURUErrAction=BURUErrTeardown), a BA-NEG is sent to the mobile router, the binding cache entry is deleted, and all routes installed by the mobile router is removed from the Route Manager 1004, as shown in step 5800 (step S5800: send BA-NEG, delete binding cache entry, remove routes installed by sender). If the action is to (silently) ignore the prefix specified in the BU message (mrBURUErrAction=BURUErrIgnoreBU), a BA-OK message is sent to the mobile router and the binding cache is updated, as shown in step S5850 (step S5850: send BA-OK, update binding cache). If the action is to ignore the prefix specified in the BU message and warn the mobile router (mrBURUErrAction=BURUErrWarnBU), then step S5900 is taken, where a BA-OK message is sent to the mobile router with a special option to indicate that the prefix is ignored. In addition, the binding cache entry is also updated (step S5900: send BA-OK with special option to indicate prefix in BU is ignored, update binding cache).

If the action is to (silently) ignore the routes sent by RU message (mrBURUErrAction=BURUErrIgnoreRU), the step S5950 is taken, where a BA-OK message is sent to the mobile router, the binding cache entry is updated, and the routes in the Route Manager 1004 is cleaned-up so that only routes that are consistent with the prefixes in the BU message remain (step S5950: send BA-OK, update binding cache, clean-up route in Route Manager). Finally, if the action is to ignore (with warning) the routes sent by RU message (mrBURUErrAction=BURUErrWarnRU), the step S5999 is taken, where a BA-OK message is sent to the mobile router, the binding cache entry is updated, and the routes in the Route Manager 1004 is cleaned-up so that only routes that are consistent with the prefixes in the BU message remains. After the clean up, the Route Manager 1004 will also send the mobile router a RU message, informing the mobile router that some of the routes installed through the dynamic routing protocol are being deleted (step S5999: send BA-OK, update binding cache, clean-up route in Route Manager, send RU message to mobile router).

Figure 6:
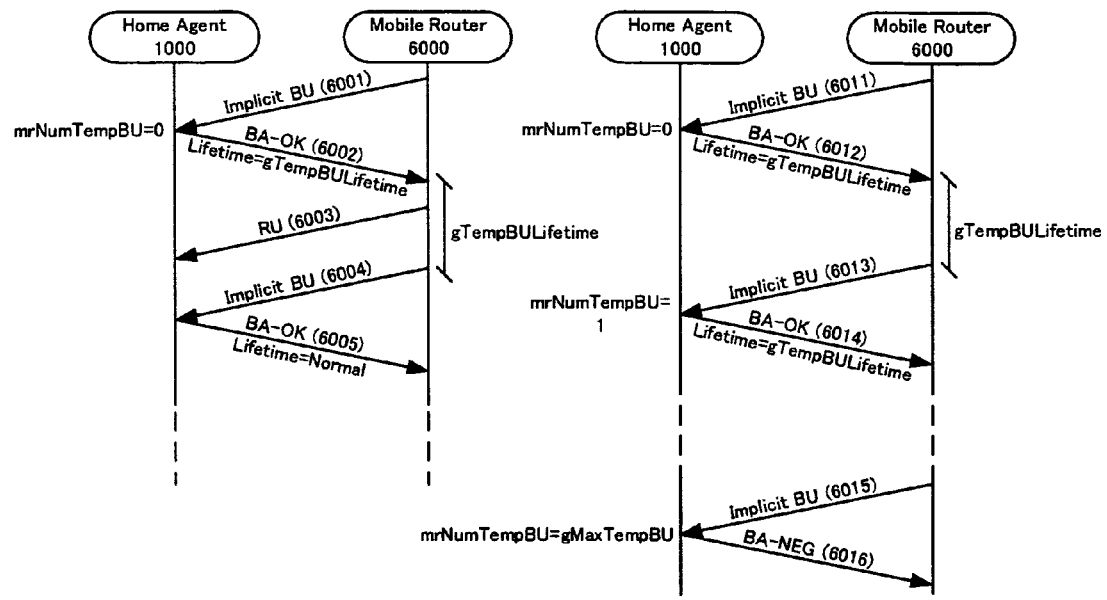
FIG. 6 is a diagram showing examples of various message exchange sequences between the home agent and mobile router when using Temporary Acceptance Technique in the embodiments of the present invention.
Figure 6:
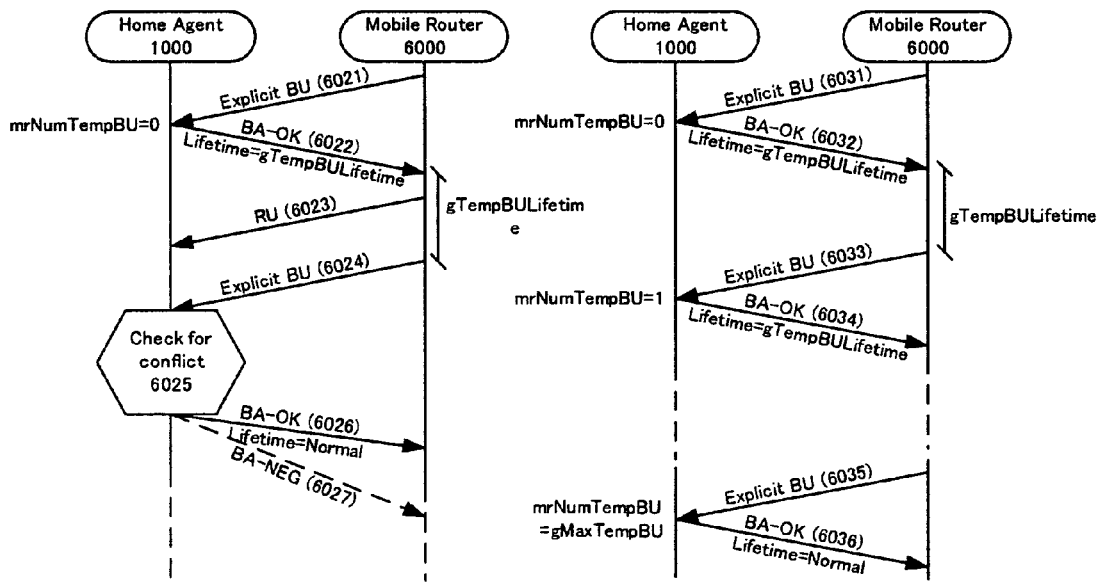

With the current invention as spelt out in the first embodiment, FIG. 6 illustrates the Temporary Acceptance Technique employed by the home agent 1000. When mobile router 6000 sends home agent 1000 an implicit BU message 6001, home agent 1000 checks the configuration and finds that mobile router 6000 is configured to run a dynamic routing protocol. The Temporary Acceptance Technique is then employed. As mrNUMTempBU is zero, a BA-OK message 6002 is returned, with a small Lifetime value of gTempBULifetime. This establishes the bi-directional tunnel, and thus mobile router 6000 can now send RU message 6003 to home agent 1000. When the binding expires after gTempBULifetime, mobile router 6000 is forced to renew the binding, and sends another implicit mode BU message 6004 to home agent 1000. Since a RU message 6003 has already been received, the home agent 1000 grants the establishment of the bi-directional tunnel the normal lifetime value, as seen with the BA-OK message 6005.

In a separate scenario, mobile router sends home agent 1000 an implicit mode BU message 6011. Again, the home agent 1000, in anticipation of a RU message from mobile router 6000, establishes the bi-directional tunnel with a short lifetime of gTempBULifetime (BA-OK message 6012). This time, however, the mobile router 6000 does not run the dynamic routing protocol, and attempts to renew the binding after every gTempBULifetime expires. When the counter mrNumTempBU reaches gMaxTempBU, the home agent 1000 concludes that the mobile router 6000 is not going to run the dynamic routing protocol, and thus rejects the binding with a BA-NEG message 6016.

The Temporary Acceptance Technique is used in explicit mode BU handling to check the consistency of prefixes announced within BU messages and routing information disseminated using RU messages. In FIG. 6, the mobile router 6000 sends an explicit mode BU message 6021 to the home agent 1000. Home agent 1000 checks the configuration and finds that mobile router 6000 is configured to run a dynamic routing protocol. The Temporary Acceptance Technique is then employed. As mrNUMTempBU is zero, a BA-OK message 6022 is returned, with a small Lifetime value of gTempBULifetime. This establishes the bi-directional tunnel, and thus mobile router 6000 can now send RU message 6023 to home agent 1000. When the binding expires after gTempBULifetime, mobile router 6000 is forced to renew the binding, and sends another explicit mode BU message 6024 to home agent 1000. Since a RU message 6023 has already been received, the home agent 1000 can now check the consistency of the prefix in BU message 6024 and RU message 6023, and grants the establishment of the bi-directional tunnel the normal lifetime value, as seen with the BA-OK message 6026 should there be no conflict (due to checking for conflict 6025), or rejects the binding by sending a BA-NEG message 6027 should there be conflict.

In a separate scenario, mobile router sends the home agent 1000 an explicit mode BU message 6031. Again, the home agent 1000, in anticipation of a RU message from mobile router 6000, establishes the bi-directional tunnel with a short lifetime of gTempBULifetime (BA-OK message 6032). This time, however, the mobile router 6000 does not run the dynamic routing protocol, and attempts to renew the binding after every gTempBULifetime expires. When the counter mrNumTempBU reaches gMaxTempBU, the home agent 1000 concludes that the mobile router 6000 is not going to run the dynamic routing protocol, and thus grants the bi-directional tunnel the full lifetime value with the BA-OK message 6036.

Hence with the current invention as disclosed in the first embodiment deployed, home agent 1000 can effectively check for error conditions arising from mobile router running dynamic routing protocols over bi-directional tunnels established. With the use of the Temporary Acceptance Technique, it can also limit the time period which errors can occur to the time it can rectify such errors. This allows for a graceful fail-over due to errors. In addition, with the parameters controlling or managing the error checking algorithm fully configurable with the Configuration Interface 1006, the current invention also provides network administrators with high flexibility to rectify errors in a more promptly manner. Incidentally, it is preferable that temporary services provided by the Temporary Acceptance Technique are selectively controlled or managed so as to enable only dynamic routing protocol from the aspect of security.

Second Embodiment

The second embodiment of the present invention discloses a mechanism for mobile router to set-up a bi-directional tunnel with its home agent, and attempt to obtain prefix delegated from the home agent. If the home agent does not do prefix delegation, the mobile router will gracefully revert to a default prefix. To this end, an apparatus as depicted in FIG. 7 is employed in mobile routers.

Figure 7:
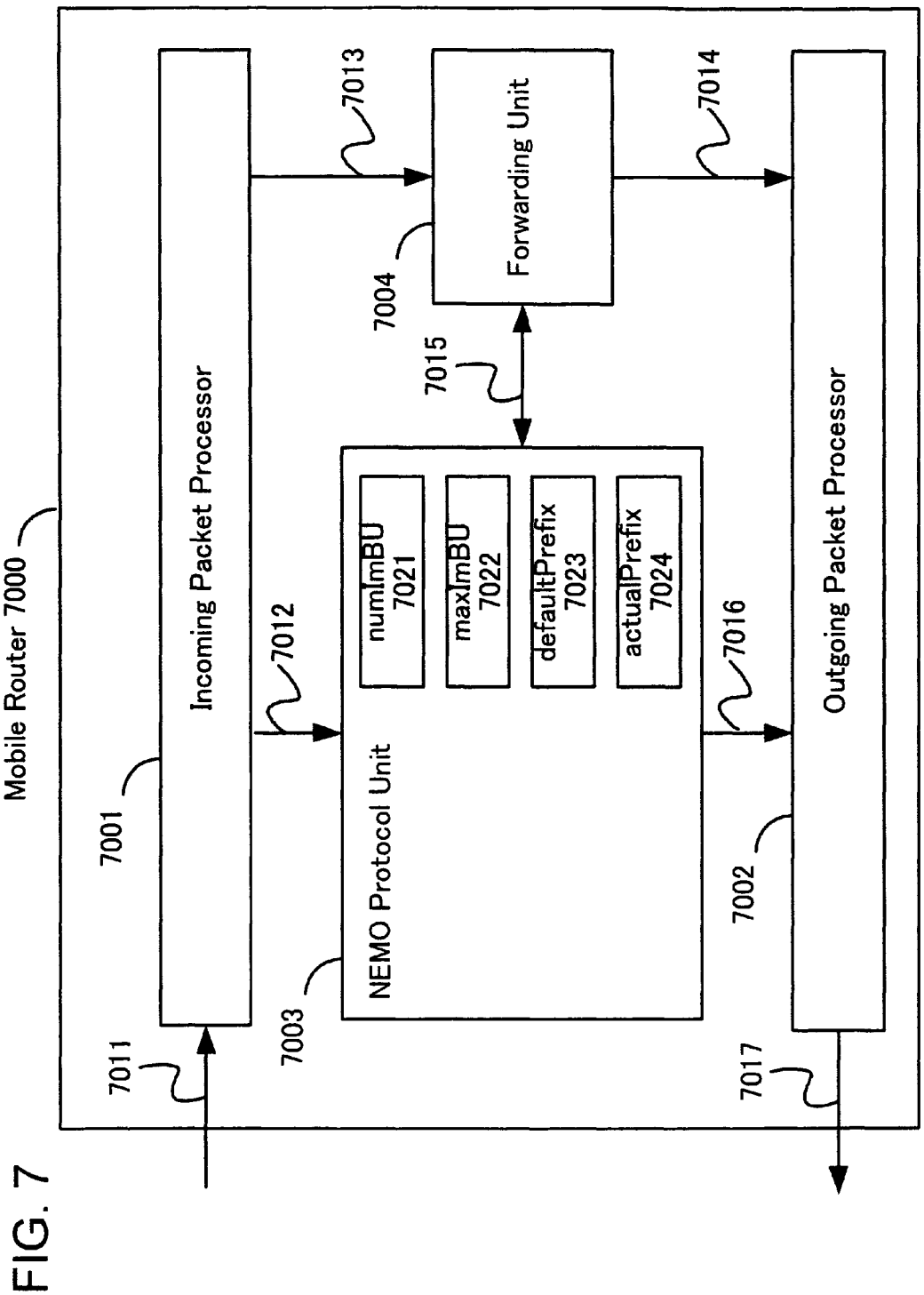
FIG. 7 is a diagram showing architecture of a mobile router in the embodiments of the present invention.

FIG. 7 shows the architecture of a mobile router 7000 employing the current invention, consisting of an Incoming Packet Processor block 7001, an Outgoing Packet Processor block 7002, a NEMO Protocol Unit 7003, and a Forwarding Unit 7004. Packet flow paths 7011 through 7017 indicate the possible flow paths of a data packet.

Packets received by the mobile router 7000 are passed to Incoming Packet Processor 7001 via the packet flow path 7011 for all standard networking protocol processing (such as Internet Protocol processing). When packets are identified to be mobility related (such as a BA message), the Incoming Packet Processor 7001 will pass such packets to the NEMO Protocol Unit 7003 via the packet flow path 7012. Packets that need to be forwarded to other nodes are passed to the Forwarding Unit 7004 via the packet flow path 7013. Note that the Incoming Packet Processor 7001 is also responsible for decapsulating packets received from an established bi-directional tunnel.

The Outgoing Packet Processor 7002 handles the processing of packets necessary before sending packets out to the physical network wires. The processing involved may include selecting a default route if no route is indicated by the sending module and filling in empty fields with default values in the mandatory protocol headers of the outgoing packets. After processing, packets are sent out to the physical medium via the packet flow path 7017.

The Forwarding Unit 7004 is responsible for the routing of packets to other nodes. For packets that need to be encapsulated to the home agent of mobile router 7000, the Forwarding Unit 7004 can pass the packet to the NEMO Protocol Unit 7003 using the packet flow path 7015. For packets that are sent to nodes within the mobile network of the mobile router

7000, the packets are passed to the Outgoing Packet Processor 7002 using the packet flow path 7014 for transmission.

The NEMO Protocol Unit 7003 is responsible for handling of NEMO (Network Mobility) related packets, such as BA messages. It is also responsible for setting up the bi-directional tunnel with the home agent of mobile router 7000. This means that the NEMO Protocol Unit 7003 needs to send out BU messages to the home agent. This can be done via the packet flow path 7016. Also, it is responsible for tunneling packets to be forwarded from the home agent. Thus the Forwarding Unit 7004 needs to pass packet that are sent to nodes out of the mobile network controlled by mobile router 7000 to the NEMO Protocol Unit 7003 for encapsulation. As mentioned previously, the Forwarding Unit 7004 can pass the packet to the NEMO Protocol Unit 7003 via packet flow path 7015.

The current invention requires that the NEMO Processing Unit 7003 maintains the following memory store to hold variables:

(i) numImBU: a counter to store the number of implicit mode BU messages the mobile router 7000 has sent to its home agent;

(ii) maxImBU: a constant giving the maximum number of implicit mode BU messages to send;

(iii) defaultPrefix: a default list of mobile network prefixes the mobile router 7000 should use in the event it fails to obtain the prefix delegated by its home agent;

(iv) actualPrefix: the actual list of mobile network prefixes that the mobile router 7000 is using for the current bi-directional tunnel session.

Figure 8:
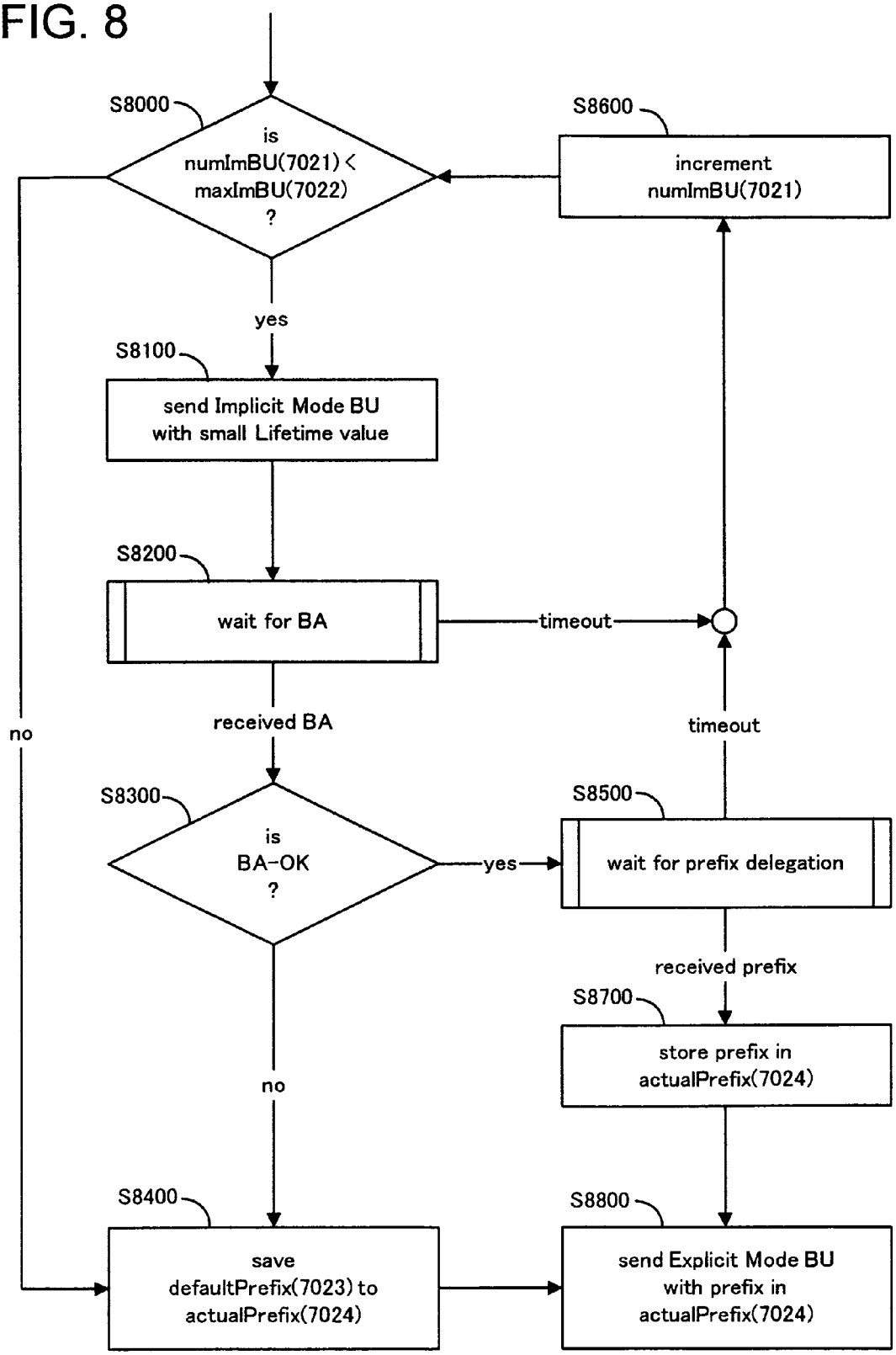
FIG. 8 is a diagram showing an algorithm used by the mobile router when sending binding updates to a home agent in the embodiments of the present invention.

FIG. 8 shows the algorithm used by the mobile router 7000 when setting up the bi-directional tunnel. In step S8000, the mobile router 7000 first check if the counter numImBU 7021 is less than the maximum limit maxImBU 7022 (step S8000: is numImBU(7021)<maxImBU(7022)?). If it is greater than or equal to maxImBU 7022, the mobile router would use the default prefix. This is shown in step S8400, where the defaultPrefix list 7023 is stored as the actualPrefix list 7024 (step S8400: save defaultPrefix(7023) to actualPrefix(7024)), and an explicit mode BU message is sent to the home agent using the actualPrefix list 7024 (step S8800: send Explicit Mode BU with prefix in actualPrefix(7024)). If numImBU 7021 is smaller than maxImBU 7022, the mobile router 7000 then sends the home agent an implicit mode BU message, with a small Lifetime value, as shown in step S8100 (step S8100: send Implicit Mode BU with small Lifetime value). It then waits for a BA message from the home agent (step S8200: wait for BA) If the BA message did not arrive before a predetermined timeout value (possibly equals to the small Lifetime value used with the implicit mode BU message), step S8600 will be taken, where the counter numImBU 7021 is incremented (step S8600: increment numImBU(7021)). And then, Step S8000 is taken back again and the whole process is tried again.

Should a BA-NEG message arrives, this means that the home agent does not have a prefix to be delegated to the mobile router 7000. The mobile router 7000 then uses the defaultPrefix list 7023, as shown in steps S8400 and S8800. Should a BA-OK message arrives, the mobile router 7000 then enters a wait loop for a prefix delegation, as shown in step S8500 (step S8500: wait for prefix delegation). If the prefix delegation did not arrive before a predetermined timeout value (possibly equal to the small Lifetime value used with the implicit mode BU message), step S8600 will be taken, where the counter numImBU 7021 is incremented. And then, Step S8000 is taken back again and the whole process is tried again. If the prefix delegation arrives, the prefix delegated is stored in the actualPrefix list 7024 as shown in step S8700 (step S8700: store prefix in actualPrefix(7024)), and this is used for subsequent explicit mode BU messages (step S8800: send Explicit Mode BU with prefix in actualPrefix(7024)).

Hence with the apparatus and method disclosed in the second embodiment of the current invention, a mobile router can have a graceful bi-directional tunnel establishment by first testing if the home agent has prefix to delegate, and fall back to using a default set of prefix if the home agent does not delegate prefix.

INDUSTRIAL APPLICABILITY

An apparatus and method of the present invention have the advantage of certainly performing dynamic routing and error checking processes in the mobile network. The present invention can be applied to the technology about a mobile network, especially, to the technique of dynamic routing with the bi-directional tunnel between a mobile router and a home agent.

The invention claimed is:

1. An apparatus used in a communication node in a packet-switched data communication mobile network wherein the communication node serves as a home agent for mobile routers so that a bi-directional tunnel is established between the home agent and one of the mobile routers through which packets sent to the mobile network via the mobile router are intercepted by the home agent and forwarded to the mobile router through the bi-directional tunnel, and packets sent by nodes from the mobile network are intercepted by the mobile router and forwarded to the home agent through the bi-directional tunnel to be further routed to an appropriate destination, the apparatus comprising:

an Incoming Packet Processor that processes incoming packets for standard networking protocol processing, and outputs the incoming packets once types of the incoming packets are identified;

an Outgoing Packet Processor that performs processing before sending a packet to physical media;

a Binding Manager that maintains bindings between home-addresses and care-of-addresses of registered mobile nodes, and handles data packets received by the Incoming Packet Processor that are identified to be related to the bindings of the registered mobile routers' addresses;

a Route Manager that maintains routing information and handles routing update messages that are received by the Incoming Packet Processor;

a Configuration Interface that provides configuration information about the home agent and all its legal mobile router users; and a Forwarding Unit that is responsible for the routing of packets to other nodes, wherein the Binding Manager temporarily accepts a first binding update from the mobile router that does not explicitly specify any mobile network prefix and does not have a default associated network prefix to wait for the mobile router to run a dynamic routing protocol by specifying a short Lifetime value in a binding acknowledgement, and rejects subsequent binding updates in a case that the mobile router fails to send prefix information using the dynamic routing protocol after a predetermined period of time elapses since the first binding update is accepted.

2. The apparatus according to claim 1, wherein the Configuration Interface further provides a set of configuration parameters relating to the home agent and comprising:

(i) information on whether the dynamic routing protocol is enabled for mobile routers that are away from home;

(ii) a maximum lifetime of binding cache entries;
(iii) a maximum lifetime of routing table entries;
(iv) a lifetime of a binding cache entry to use when it is unknown whether the dynamic routing protocol will be run by an away mobile router; and
(v) a maximum number of Binding Update messages to accept when it is unknown whether the dynamic routing protocol will be run by the away mobile router.

3. The apparatus according to claim 1, wherein the Configuration Interface further provides a set of configuration parameters for each mobile router that is a legal user of the home agent, the configuration parameters comprising:
 (i) information on security associations of the mobile router;
 (ii) information on whether the mobile router is authorized to run dynamic routing protocols;
 (iii) a type of the dynamic routing protocols the mobile router is authorized to run;
 (iv) a set of default network prefixes that are associated to the mobile router;
 (v) a range of network prefixes that can be legally associated to the mobile router; and
 (vi) a default action to be taken when prefix information contained in a binding update message is in conflict or inconsistent with the routing information sent by the mobile router.

4. The apparatus according to claim 1, wherein the Binding Manager further maintains information about each registered mobile router, the information comprising:
 (i) a home-address of the mobile router;
 (ii) a care-of-address of the mobile router;
 (iii) information relating to whether a transmission mode of the last successful binding update message received from the mobile router corresponds to implicit mode or explicit mode;
 (iv) an expiration time for the information about each registered mobile router;
 (v) prefix information contained in the last successful binding update message received; and
 (vi) a number of binding update messages received from the mobile router when it is unknown whether the dynamic routing protocol will be run by the mobile router.

5. An apparatus used in a communication node in a packet-switched data communication mobile network wherein the communication node serves as a home agent for mobile routers so that a bi-directional tunnel is established between the home agent and one of the mobile routers through which packets sent to the mobile network via the mobile router are intercepted by the home agent and forwarded to the mobile router through the bi-directional tunnel, and packets sent by nodes from the mobile network are intercepted by the mobile router and forwarded to the home agent through the bi-directional tunnel to be further routed to an appropriate destination, the apparatus comprising:
 an Incoming Packet Processor that processes incoming packets for standard networking protocol processing, and outputs the incoming packets once types of the incoming packets are identified;
 an Outgoing Packet Processor that performs processing before sending a packet to physical media;
 a Binding Manager that maintains bindings between home-addresses and care-of-addresses of registered mobile nodes, and handles data packets received by the Incoming Packet Processor that are identified to be related to the bindings of the registered mobile routers' addresses;
 a Route Manager that maintains routing information and handles routing update messages that are received by the Incoming Packet Processor;
 a Configuration Interface that provides configuration information about the home agent and all its legal mobile router users; and
 a Forwarding Unit that is responsible for the routing of packets to other nodes,
 wherein the Binding Manager temporarily accepts a first binding update from the mobile router that explicitly specifies a single or plurality of mobile network prefixes to wait for the mobile router to run a dynamic routing protocol by specifying a short Lifetime value in a binding acknowledgement, and rejects subsequent binding updates in a case that any of the explicitly specified prefixes is in conflict with routes installed by the routing update messages sent from the mobile router running the dynamic routing protocol, or accepts the subsequent binding updates with normal Lifetime values in a case that the conflict is not detected after a pre-determined period of time elapses since the first binding update is accepted.

6. The apparatus according to claim 5, wherein the Configuration Interface further provides a set of configuration parameters relating to the home agent and comprising:
 (i) information on whether the dynamic routing protocol is enabled for mobile routers that are away from home;
 (ii) a maximum lifetime of binding cache entries;
 (iii) a maximum lifetime of routing table entries;
 (iv) a lifetime of a binding cache entry to use when it is unknown whether the dynamic routing protocol will be run by an away mobile router; and
 (v) a maximum number of Binding Update messages to accept when it is unknown whether the dynamic routing protocol will be run by the away mobile router.

7. The apparatus according to claim 5, wherein the Configuration Interface further provides a set of configuration parameters for each mobile router that is a legal user of the home agent, the configuration parameters comprising:
 (i) information on security associations of the mobile router;
 (ii) information on whether the mobile router is authorized to run dynamic routing protocols;
 (iii) a type of the dynamic routing protocols the mobile router is authorized to run;
 (iv) a set of default network prefixes that are associated to the mobile router;
 (v) a range of network prefixes that can be legally associated to the mobile router; and
 (vi) a default action to be taken when prefix information contained in a binding update message is in conflict or inconsistent with the routing information sent by the mobile router.

8. The apparatus according to claim 5, wherein the Binding Manager further maintains information about each registered mobile router, the information comprising:
 (i) a home-address of the mobile router;
 (ii) a care-of-address of the mobile router;
 (iii) information relating to whether a transmission mode of the last successful binding update message received from the mobile router corresponds to implicit mode or explicit mode;
 (iv) an expiration time for the information about each registered mobile router;
 (v) prefix information contained in the last successful binding update message received; and (vi) a number of binding update messages received from the mobile router when it is unknown whether the dynamic routing protocol will be run by the mobile router.

9. A method for processing a binding update message received by a mobile router's home agent which includes an apparatus used in a communication node in a packet-switched data communication mobile network wherein the communication node serves as a home agent for mobile routers so that a bi-directional tunnel is established between the home agent and one of the mobile routers through which packets sent to the mobile network via the mobile router are intercepted by the home agent and forwarded to the mobile router through the bi-directional tunnel, and packets sent by nodes from the mobile network are intercepted by the mobile router and forwarded to the home agent through the bi-directional tunnel to be further routed to an appropriate destination, the apparatus comprising: an Incoming Packet Processor that processes incoming packets for standard networking protocol processing, and passes the incoming packets to different components of the apparatus once types of the incoming packets are identified; an Outgoing Packet Processor that performs processing before sending a packet out to physical media; a Binding Manager that maintains bindings between home-addresses and care-of-addresses of registered mobile nodes, and handles data packets received by the Incoming Packet Processor that are identified to be related to the bindings of the registered mobile routers' addresses; a Route Manager that maintains routing information and handles routing update messages that are received by the Incoming Packet Processor; a Configuration Interface that provides configuration information about the home agent and all its legal mobile router users; and a Forwarding Unit that is responsible for the routing of packets to other nodes, wherein the binding update message does not contain any mobile network prefix information, the method comprising the steps of:

checking whether the mobile router is authorized to run a dynamic routing protocol;

when the mobile router is not authorized to run the dynamic routing protocol and when there is no default network prefix associated with the mobile router, sending back a negative acknowledgement;

when the mobile router is not authorized to run the dynamic routing protocol and when there is a single or plurality of default network prefixes associated with the mobile router, sending back a positive acknowledgement, updating the binding information in the Binding Manager, and installing routes to the default network prefixes in the Route Manager;

when the mobile router is authorized to run the dynamic routing protocol and when the mobile router has already sent the routing update messages, consulting the Route Manager;

when the mobile router is authorized to run the dynamic routing protocol and has sent the routing update messages to the home agent, sending back the positive acknowledgement and updating the binding information in the Binding Manager;

when the mobile router is authorized to run the dynamic routing protocol but has not sent the routing update messages to the home agent and when a number of binding update messages received from the mobile router is less than a pre-determined positive number, sending back the positive acknowledgement with a small Lifetime value and updating the binding information in the Binding Manager; and when the mobile router is authorized to run the dynamic routing protocol but has not sent the routing update messages to the home agent and when the number of binding update messages received from the mobile router is greater than or equal to the pre-determined positive number, sending back the negative acknowledgement and removing the binding information in the Binding Manager.

10. A method for error recovery when processing a binding update message received by a mobile router's home agent which includes an apparatus used in a communication node in a packet-switched data communication mobile network wherein the communication node serves as the home agent for the mobile router so that a bi-directional tunnel is established between the home agent and the mobile router through which packets sent to the mobile network via the mobile router are intercepted by the home agent and forwarded to the mobile router through the bi-directional tunnel, and packets sent by nodes from the mobile network are intercepted by the mobile router and forwarded to the home agent through the bi-directional tunnel to be further routed to an appropriate destination, the apparatus comprising: an Incoming Packet Processor that processes incoming packets for standard networking protocol processing, and passes the incoming packets to different components of the apparatus once types of the incoming packets are identified; an Outgoing Packet Processor that performs processing before sending a packet out to physical media; a Binding Manager that maintains bindings between home-addresses and care-of-addresses of registered mobile nodes, and also handles data packets received by the Incoming Packet Processor that are identified to be related to the bindings of the registered mobile routers' addresses; a Route Manager that maintains routing information and handles routing update messages that are received by the Incoming Packet Processor; a Configuration Interface that provides configuration information about the home agent and all its legal mobile router users; and a Forwarding Unit that is responsible for the routing of packets to other nodes, wherein the binding update message contains information related to a single or plurality of mobile network prefixes that is in conflict with routes installed by a dynamic routing protocol run by the mobile router, the method comprising the steps of:

checking configured error behavior in the configuration information for the mobile router;

when the configured error behavior indicates to tear down the bi-directional tunnel, sending the mobile router a negative binding acknowledgment, removing binding information related to the mobile router in the Binding Manager and removing all routes installed by the mobile router from the Route Manager;

when the configured error behavior indicates to silently ignore the prefix information specified in the binding update message, sending the mobile router a positive binding acknowledgment and updating the binding information related to the mobile router in the Binding Manager;

when the configured error behavior indicates to ignore the prefix information specified in the binding update message with a warning, sending the mobile router the positive binding acknowledgment with a special option indicating the prefix information is ignored and updating the binding information related to the mobile router in the Binding Manager;

when the configured error behavior indicates to silently ignore the routes installed using the dynamic routing protocol, sending the mobile router the positive binding acknowledgment, updating the binding information related to the mobile router in the Binding Manager, removing all of the routes installed by the mobile router from the mobile router and installing routes in the Route Manager based on the prefix information specified in the binding update message; and when the configured error behavior indicates to ignore the routes installed using the dynamic routing protocol with a warning, sending the mobile router the positive binding acknowledgment, updating the binding information related to the mobile router in the Binding Manager, removing all of the routes installed by the mobile router from the mobile router, installing routes in the Route Manager based on the prefix information specified in the binding update message, and instructing the Route Manager to inform the mobile router of the changes in routes using the dynamic routing protocol.

11. A method for processing a binding update message received by a mobile router's home agent which includes an apparatus used in a communication node in a packet-switched data communication mobile network wherein the communication node serves as the home agent for the mobile router so that a bi-directional tunnel is established between the home agent and the mobile router through which packets sent to the mobile network via the mobile router are intercepted by the home agent and forwarded to the mobile router through the bi-directional tunnel, and packets sent by nodes from the mobile network are intercepted by the mobile router and forwarded to the home agent through the bi-directional tunnel to be further routed to an appropriate destination, the apparatus comprising: an Incoming Packet Processor that processes incoming packets for standard networking protocol processing, and passes the incoming packets to different components of the apparatus once types of the incoming packets are identified; an Outgoing Packet Processor that performs processing before sending a packet out to physical media; a Binding Manager that maintains bindings between home-addresses and care-of-addresses of registered mobile nodes, and also handles data packets received by the Incoming Packet Processor that are identified to be related to the bindings of the registered mobile routers' addresses; a Route Manager that maintains routing information and handles routing update messages that are received by the Incoming Packet Processor; a Configuration Interface that provides configuration information about the home agent and all its legal mobile router users; and a Forwarding Unit that is responsible for the routing of packets to other nodes, wherein the binding update message contains information related to a single or plurality of mobile network prefixes, the method comprising the steps of:

sending back a negative acknowledgement and removing the binding information in the Binding Manager when the prefix information specified in the binding update message is invalid;

when the prefix information specified in the binding update message is valid and the mobile router is not authorized to run a dynamic routing protocol, sending back a positive acknowledgement, updating the binding information in the Binding Manager, and installing routes in the Route Manager based on the prefix information specified in the binding update message;

when the prefix information specified in the binding update message is valid, the mobile router is authorized to run the dynamic routing protocol, and the mobile router has already sent the routing update messages, consulting the Route Manager;

when the prefix information specified in the binding update message is valid, the mobile router is authorized to run the dynamic routing protocol but has not sent the routing update messages to the home agent, and a number of binding update messages received from the mobile router is less than a pre-determined positive number, sending back a positive acknowledgement with a small Lifetime value, updating the binding information in the Binding Manager, and installing routes based on the prefix information specified in the binding update to the Route Manager;

when the prefix information specified in the binding update message is valid, the mobile router is authorized to run the dynamic routing protocol but has not sent the routing update messages to the home agent, and the number of binding update messages received from the mobile router is greater than or equal to the pre-determined positive number, sending back a positive acknowledgement with a normal Lifetime value, updating the binding information in the Binding Manager, and installing routes based on the prefix information specified in the binding update to the Route Manager;

when the prefix information specified in the binding update message is valid, the mobile router has sent the routing update messages to the home agent, and the prefix information specified in the binding update message is in conflict with the routes installed by the mobile router via the routing update messages, checking with the Route Manager;

sending back a positive acknowledgement, updating the binding information in the Binding Manager, and installing routes based on the prefix information specified in the binding update to the Route Manager when the prefix information specified in the binding update message is valid and not in conflict with the routes installed by the mobile router via the routing update messages; and performing, when the prefix information specified in the binding update message is valid but in conflict with the routes installed by the mobile router via the routing update messages, a second method comprising the steps of:

checking configured error behavior in the configuration information for the mobile router;

when the configured error behavior indicates to tear down the bi-directional tunnel, sending the mobile router a negative binding acknowledgment, removing binding information related to the mobile router in the Binding Manager and removing all routes installed by the mobile router from the Route Manager;

when the configured error behavior indicates to silently ignore the prefix specified in the binding update message, sending the mobile router a positive binding acknowledgment and updating the binding information related to the mobile router in the Binding Manager;

when the configured error behavior indicates to ignore the prefix specified in the binding update message with a warning, sending the mobile router the positive binding acknowledgment with a special option indicating the prefix is ignored and updating the binding information related to the mobile router in the Binding Manager;

when the configured error behavior indicates to silently ignore the routes installed using the dynamic routing protocol, sending the mobile router the positive binding acknowledgment, updating the binding information related to the mobile router in the Binding Manager, removing all of the routes installed by the mobile router from the mobile router and installing routes in the Route Manager based on the prefix information specified in the binding update message; and when the configured error behavior indicates to ignore the routes installed using the dynamic routing protocol with a warning, sending the mobile router the positive binding acknowledgment, updating the binding information related to the mobile router in the Binding Manager, removing all of the routes installed by the mobile router from the mobile router, installing routes in the Route Manager based on the prefix information specified in the binding update message, and instructing the Route Manager to inform the mobile router of the changes in routes using the dynamic routing protocol.

12. A method for processing a binding update message received by a mobile router's home agent which includes an apparatus used in a communication node in a packet-switched data communication mobile network wherein the communication node serves as the home agent for the mobile router so that a bi-directional tunnel is established between the home agent and the mobile router through which packets sent to the mobile network via the mobile router are intercepted by the home agent and forwarded to the mobile router through the bi-directional tunnel, and packets sent by nodes from the mobile network are intercepted by the mobile router and forwarded to the home agent through the bi-directional tunnel to be further routed to an appropriate destination, the apparatus comprising: an Incoming Packet Processor that processes incoming packets for standard networking protocol processing, and passes the incoming packets to different components of the apparatus once types of the incoming packets are identified; an Outgoing Packet Processor that performs processing before sending a packet out to physical media; a Binding Manager that maintains bindings between home-addresses and care-of-addresses of registered mobile nodes, and also handles data packets received by the Incoming Packet Processor that are identified to be related to the binding of the registered mobile routers' addresses; a Route Manager that maintains routing information and handles routing update messages that are received by the Incoming Packet Processor; a Configuration Interface that provides configuration information about the home agent and all its legal mobile router users; and a Forwarding Unit that is responsible for the routing of packets to other nodes, the method comprising the steps of:

checking if the mobile router is an authorized user of the home agent and returning a negative binding acknowledgement if the mobile router is not an authorized user;

when the mobile router is an authorized user of the home agent and a Lifetime field of a binding update message is zero, sending a positive binding acknowledgement to the mobile router, deleting binding information associated with the mobile router in the Binding Manager, and removing all routes installed by the mobile router in the Route Manager;

when the mobile router is an authorized user of the home agent, the Lifetime field of the binding update message is non-zero, and the binding update message does not contain any network prefix information, processing the binding update message using a second method, the second method comprising the steps of:

checking if the mobile router is authorized to run a dynamic routing protocol;

when the mobile router is not authorized to run the dynamic routing protocol and there is no default network prefix associated with the mobile router, sending back a negative acknowledgement;

when the mobile router is not authorized to run the dynamic routing protocol and there is a single or plurality of default network prefixes associated with the mobile router, sending back a positive acknowledgement, updating the binding information in the Binding Manager, and installing routes to the default network prefixes in the Route Manager;

when the mobile router is authorized to run the dynamic routing protocol and the mobile router has already sent routing update messages, consulting the Route Manager;

when the mobile router is authorized to run the dynamic routing protocol and has sent the routing update messages to the home agent, sending back a positive acknowledgement and updating the binding information in the Binding Manager;

when the mobile router is authorized to run the dynamic routing protocol but has not sent the routing update messages to the home agent and a number of binding update messages received from the mobile router is less than a pre-determined positive number, sending back a positive acknowledgement with a small Lifetime value and updating the binding information in the Binding Manager; and when the mobile router is authorized to run the dynamic routing protocol but has not sent the routing update messages to the home agent and the number of binding update messages received from the mobile router is greater than or equal to the pre-determined positive number, sending back a negative acknowledgement and removing the binding information in the Binding Manager; and when the mobile router is an authorized user of the home agent, the Lifetime field of the binding update message is non-zero, and the binding update message contains information related to a single or plurality of network prefixes, processing the binding update message using a third method, the third method comprising the steps of:

sending back a negative acknowledgement and removing the binding information in the Binding Manager if the prefix information specified in the binding update message is invalid;

when the prefix information specified in the binding update message is valid and the mobile router is not authorized to run the dynamic routing protocol, sending back a positive acknowledgement, updating the binding information in the Binding Manager, and installing routes in the Route Manager based on the prefix information specified in the binding update message;

when the prefix information specified in the binding update message is valid, the mobile router is authorized to run the dynamic routing protocol, and the mobile router has already sent the routing update messages, consulting the Route Manager;

when the prefix information specified in the binding update message is valid, the mobile router is authorized to run the dynamic routing protocol but has not sent the routing update messages to the home agent, and the number of binding update messages received from the mobile router is less than the pre-determined positive number, sending back a positive acknowledgement with a small Lifetime value, updating the binding information in the Binding Manager, and installing routes based on the prefix information specified in the binding update to the Route Manager;

when the prefix information specified in the binding update message is valid, the mobile router is authorized to run the dynamic routing protocol but has not sent the routing update messages to the home agent, and the number of binding update messages received from the mobile router is greater than or equal to the pre-determined positive number, sending back a positive acknowledgement with normal Lifetime value, updating the binding information in the Binding Manager, and installing routes based on the prefix information specified in the binding update to the Route Manager;

when the prefix information specified in the binding update message is valid, the mobile router has sent routing update messages to the home agent, and the prefix information specified in the binding update message is in conflict with the routes installed by the mobile router via the routing update messages, checking with the Route Manager;

sending back a positive acknowledgement, updating the binding information in the Binding Manager, and installing routes based on the prefix information specified in the binding update to the Route Manager when the prefix information specified in the binding update message is valid and not in conflict with the routes installed by the mobile router via the routing update messages; and performing, when the prefix information specified in the binding update message is valid but in conflict with the routes installed by the mobile router via the routing update messages, a fourth method comprising the steps of:

checking configured error behavior in the configuration information for the mobile router;

when the configured error behavior is to tear down the bi-directional tunnel, sending the mobile router a negative binding acknowledgment, removing the binding information related to the mobile router in the Binding Manager and removing all routes installed by the mobile router from the Route Manager;

when the configured error behavior is to silently ignore the prefix specified in the binding update message, sending the mobile router a positive binding acknowledgment and updating the binding information related to the mobile router in the Binding Manager;

when the configured error behavior is to ignore the prefix specified in the binding update message with a warning, sending the mobile router a positive binding acknowledgment with a special option indicating the prefix is ignored and updating the binding information related to the mobile router in the Binding Manager;

when the configured error behavior is to silently ignore the routes installed using the dynamic routing protocol, sending the mobile router a positive binding acknowledgment, updating the binding information related to the mobile router in the Binding Manager, removing all of the routes installed by the mobile router from the mobile router and installing routes in the Route Manager based on the prefix information specified in the binding update message; and when the configured error behavior is to ignore the routes installed using the dynamic routing protocol with a warning, sending the mobile router a positive binding acknowledgment, updating the binding information related to the mobile router in the Binding Manager, removing all of the routes installed by the mobile router from the mobile router, installing routes in the Route Manager based on the prefix information specified in the binding update message, and instructing the Route Manager to inform the mobile router of the changes in routes using the dynamic routing protocol.

* * * * *